United States Patent
Goodhill et al.

[19]

[11] Patent Number: 6,019,473
[45] Date of Patent: Feb. 1, 2000

[54] SWITCHABLE FORMAT FILM PROJECTION SYSTEM

[75] Inventors: Dean K. Goodhill; Don P. Behrns, both of Los Angeles, Calif.

[73] Assignee: MaxiVision Cinema Technology, Los Angeles, Calif.

[21] Appl. No.: 08/907,429

[22] Filed: Aug. 7, 1997

Related U.S. Application Data

[63] Continuation-in-part of application No. 08/598,033, Feb. 7, 1996.

[51] Int. Cl.⁷ ..................................................... G03B 21/48
[52] U.S. Cl. ........................................... 352/180; 352/187
[58] Field of Search .................................... 352/168, 180, 352/187

[56] References Cited

U.S. PATENT DOCUMENTS

| | | |
|---|---|---|
| 1,318,610 | 10/1919 | Sereinsky . |
| 1,835,743 | 12/1931 | Aster . |
| 1,921,494 | 8/1933 | Wildhaber . |
| 1,999,754 | 4/1935 | Evans . |
| 2,079,572 | 5/1937 | Kiel . |
| 3,285,087 | 11/1966 | Wells . |
| 3,565,521 | 2/1971 | Butler et al. . |
| 3,741,636 | 6/1973 | Nakayama ............................. 352/180 |
| 3,819,258 | 6/1974 | Butler et al. . |
| 3,865,738 | 2/1975 | Lente . |

(List continued on next page.)

FOREIGN PATENT DOCUMENTS

| | | |
|---|---|---|
| 93/12456 | 6/1993 | WIPO . |
| 97/29401 | 8/1997 | WIPO . |

OTHER PUBLICATIONS

SMPTE Journal 102 (1993) Aug., No. 8 Motion Picture Prints—Projectable Image Area.
SMPTE Journal 104 (1995) May, No. 5 Prints Made on Continuous Contact Printers—Exposed Areas for Picture and Audio.

Clairmont Camera Advertisement, "New Clairmont Super 1.85: 32% More Image Area . . . ", advertisement, (undated).

DiGiulio, Edmund, "SMPTE Study Group on 30–Frame Film Rate: Final Committee Report on the Feasibility of Motion–Picture Frame–Rate," *Journal of the SMPTE*, (May 1988).

Frielinghaus, Karl–Otto, "New Investigations on Picture Steadiness of Motion Pictures in Projection", *Journal of the SMPTE*, vol. 77, (Jan. 1968).

Goodhill, Dean, "Editing A Whirlwind For 'Christmas'", *Daily Variety Special Report*, (Mar. 16, 1992).

Keller, Clarke, "Three–Perf Technology: Tomorrow's Film Format–Today", *International Photographer*, (Oct. 1987).

Lippman, John, "Too Costly For Prime Time", *L.A. Times*, (Mar. 22, 1992).

Mozer, Timothy, "Electronic Editing With Dean Goodhill", *Editors Guild Newsletter*, (Winter 1992).

(List continued on next page.)

*Primary Examiner*—David M. Gray
*Attorney, Agent, or Firm*—Knobbe, Martens, Olson & Bear, LLP

[57] ABSTRACT

The present invention relates to film transport systems for motion picture projectors and, more particularly, to a film projector movement that is capable of transporting film prints having frames spanning a predetermined number of perforations per frame at a specified projection frame-rate and then automatically switching to another film format having frames spanning a different number of perforations per frame as well as a different projection frame-rate, based on the detection of an encoded trigger strip on the film which carries the format characteristics of the incoming film. A controller enables the system to automatically switch between a variety of different film formats and frame-rates, on the same projector and on the same platter of film, without substantially interrupting or delaying operation of the projector.

23 Claims, 4 Drawing Sheets

U.S. PATENT DOCUMENTS

| | | |
|---|---|---|
| 4,105,311 | 8/1978 | Boudouris . |
| 4,120,572 | 10/1978 | Grallert et al. . |
| 4,143,951 | 3/1979 | Suzaki et al. . |
| 4,150,886 | 4/1979 | Merkel et al. . |
| 4,360,254 | 11/1982 | Nyman et al. . |
| 4,437,742 | 3/1984 | Taniguchi . |
| 4,678,298 | 7/1987 | Perisic . |
| 4,697,896 | 10/1987 | Fox . |
| 4,702,577 | 10/1987 | Weigert . |
| 4,893,921 | 1/1990 | Beauviala . |
| 4,900,293 | 2/1990 | McLendon . |
| 5,096,286 | 3/1992 | Weisgerber . |
| 5,218,388 | 6/1993 | Purdy . |
| 5,312,304 | 5/1994 | Vetter . |
| 5,341,182 | 8/1994 | Schmidt . |
| 5,506,639 | 4/1996 | Frazen et al. . |
| 5,534,954 | 7/1996 | Vetter . |
| 5,537,157 | 7/1996 | Washino et al. . |
| 5,537,165 | 7/1996 | Miyamori et al. . |
| 5,539,527 | 7/1996 | Kajimoto et al. . |
| 5,543,869 | 8/1996 | Vetter . |
| 5,739,895 | 4/1998 | Vetter . |

OTHER PUBLICATIONS

O'Grady, Frederick T., "Film Pulldown Mechanism Based On A Design By Samuel B. Grimson", *Journal of the SMPTE*, vol. 67, (Jun. 1958).

"Step Printers", Optical Printers, etc. (circa 1950).

Streiffert, J.G., "The Radial–Tooth, Variable–Pitch Sprocket", *Journal of the SMPTE*, vol. 57, (Dec. 1951).

"You Want A Whole Movie By When?!?", *Calendar*, (undated).

FIG. 6
FIG. 7
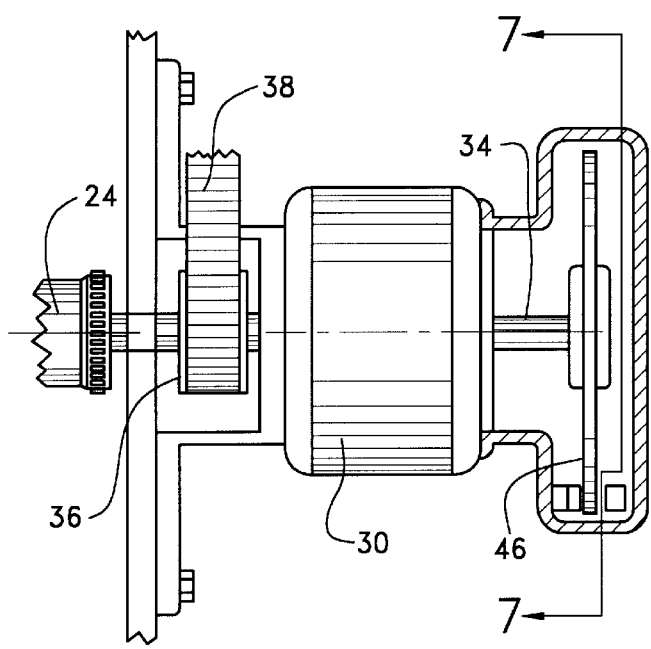
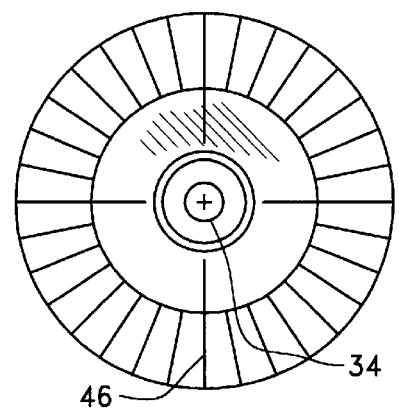

SWITCHABLE FORMAT FILM PROJECTION SYSTEM

RELATED APPLICATIONS

This is a continuation-in-part of application Ser. No. 08/598,033 filed Feb. 7, 1996.

BACKGROUND OF THE INVENTION

The present invention relates to film transport systems for motion picture projectors and, more particularly, to a film projector movement that is capable of transporting film prints in one format and then switching to another film format without interrupting the operation of the projector during the switchover.

Conventional 35 mm theatrical motion picture projectors employ a motor driven sprocket wheel which pulls the film intermittently through the film gate at a standard rate of twenty-four frames per second. During the period of film movement, a rotating shutter driven by a constant speed motor blacks out the screen to prevent blurring. The viewing audience is unaware of these moments of darkness due to the phenomenon know as "persistence of vision." Film is supplied to and taken away from the film gate and intermittent sprocket by constant speed sprockets on either side. The intermittent film movement created at the film gate is smoothed out by film loops on either side of the intermittent sprocket, which are maintained by the constant speed sprockets.

Current theatrical projectors are almost exclusively of the mechanical type. Typically, a single synchronous motor drives a drive shaft bearing multiple drive gears, which drive the shutter as well as the constant-speed and intermittent sprockets at a single speed corresponding to the U.S. standard frame-rate of 24 frames/sec. The intermittent sprocket is driven by a device called a Geneva mechanism, the purpose of which is to translate one full revolution of the drive shaft into a ninety degree rotation of the intermittent sprocket followed by a stationary period for image projection. The ninety degree rotation of a sixteen-tooth sprocket results in a four-perforation frame change (i.e., one "pulldown"). The four-perforation frame standard was established in the late 1800's to accommodate a projected aspect ratio of 1.33:1 and has not changed since that time. Consequently, commercial 35 mm projectors are designed for four-perforation pulldown at 24 frames/sec.

While virtually all theatrical 35 mm projectors are of the mechanical design, there are several specialty projectors on the market which feature electronic pulldown. These designs rely on a high response servomotor instead of the Geneva device to advance and position the film in the film gate.

Anamorphic systems are used for true widescreen presentation, which optically squeeze a 2.4:1 aspect ratio image into a 1.33:1, four-perforation camera frame during photography and subsequently unsqueeze the image during projection. In the late 1950's, the "1.85" screen format was developed in order to provide the audience with a "semi-widescreen look" without having to resort to anamorphic camera and projection lenses. Approximately eighty-five percent of the films currently in release use the 1.85:1 format. To achieve this projected aspect ratio, a mask is simply inserted into the aperture of the projection gate. This mask covers the top and bottom areas of the projection frame, thereby increasing the width to height ratio of the picture. Consequently, the exposed images in these masked areas are never seen.

In the accompanying drawings, FIG. 1 shows this quite clearly. The crosshatched area 64 represents the usable film area which is wasted in the 1.85:1 projection format with a frame height of four perforations. The area represented by the reference numeral 66 corresponds to the optical analog soundtrack. One solution to the problem of wasted film area is to change to an alternate frame height standard which provides the same projectable area as shown in FIG. 1, but without the wasted picture area at the top and bottom. One such alternate frame standard is the three-perforation frame shown in FIG. 2. By eliminating much of the area previously wasted by masking, the same projectable area can be fitted into three perforations of film instead of four. Consequently, elimination of this "wasted" area results in a reduction in release print footage, and therefore cost, by about 25%.

While the three-perforation format is a step in the right direction, it is not the ultimate in film conservation since there is still some wasted area at the top and bottom that must be masked during projection. FIG. 3 illustrates the ultimate frame height for the 1.85:1 format wherein there is virtually no wasted film area. The standard 1.85 format has an established picture width which is limited by the space reserved on the left side of the film for the optical sound track. This limiting frame width, together with the 1.85:1 aspect ratio, establishes the frame height of 0.446 inches. When a few thousandths are added for space between frames, this height corresponds to precisely 2.5 perforations of film length. The 2.5-perforation pulldown format represents a reduction in release print footage of about 37.5% when compared to the standard four-perforation format.

While film conservation and its financial impact is one of the most important issues at the moment, image enhancement may be even more important for the future of Cinema. As new digital technologies raise the quality of home viewing, theatrical exhibition will have to rise proportionately to lure audiences. Theatrical image enhancement is possible in two ways. One way is to increase the frame size, and the other way is to increase the camera and projection frame rates. Both require changes in the manner in which film is photographed and projected.

1. Increasing Frame Size

With the 1.85 format, it is possible to increase the frame size by expanding the image on film laterally into the area previously occupied by the analog sound track. The analog optical soundtrack would be replaced by redundant digital tracks. This new format is more fully explained in patent application Ser. No. 08/646,777, filed May 8, 1996, (now U.S. Pat. No. 5,745,213), which is incorporated herein by reference. By combining this enlarged frame with a 3-perforation pulldown, a 32% increase in image enhancement can be achieved concurrent with a 25% reduction in film use. Alternately, increasing the frame height to five perforations and use of novel, anamorphic lenses for this greatly enlarged format would result in a significant increase in resolution too. However, this would result in greater film use.

2. Increasing Camera and Projection Frame Rates

Increasing the camera and projection frame-rate from 24 to 30 or even 48 frames/sec has been demonstrated to provide the viewer with a significantly heightened sense of reality. Since film imaging is temporal, higher frame rates eliminate flicker and thereby allow for greater screen brightness which otherwise would emphasize such flicker while simultaneously enhancing perceived resolution and eliminating the motion anomalies known as "strobing." Strobing occurs when objects move across the screen at speeds and angles such that the illusion of cinema movement is disturbed. Strobing objects appear to jump from one position to another in an unnatural manner. This problem is solved by use of higher frame rates in photography and projection.

From the foregoing, it is apparent that there are several alternate frame heights and projection frame-rates which are highly desirable for various reasons but which suffer from the problem of incompatibility with existing projection systems The successful introduction of alternate format films into theatrical exhibition will require that these facilities be equipped with projectors that are capable of operating in all formats. It is essential that these projection systems retain the capability to project standard four-perforation, 24 frames/sec. format films along with the alternate format films, since anamorphic widescreen presentation will continue to require the full four-perforation frame. Additionally, there will always be some "classic" films and others (e.g., trailers and public service announcements) which remain in the original four-perforation format.

Several designs have been proposed that attempt to provide three/four-perforation format pulldown to existing projectors. However, the fundamental problem with these designs is that they require manual changeover of each individual sprocket in the projector when changing the format in either direction. This makes these designs wholly impractical due to time and manpower constraints. The present invention introduces a fully automatic switchable-pulldown/frame-rate projector movement. This movement will permit the same theatrical projector to exhibit various alternate format films in "back-to-back" fashion without undue attention from technicians and without hesitation in the presentation. In this manner, the present invention satisfies the problems with the prior designs and provides further related advantages.

SUMMARY OF THE INVENTION

The present invention provides a switchable format film projection system comprising a film transport system for transporting film through a projector. In the discussion of the invention that follows, the word "format" collectively refers to the classification of those film print characteristics which have an effect on the projection system design or operation, and includes the projection frame-rate (frames per second), frame height (number of perforations), frame aspect ratio (width to height) and optical system (anamorphic as opposed to spherical). For example, when used in a collective sense, such as in the phrase, "alternate formats may be used," it is intended to be inclusive of any combination of the above characteristics. In some instances, however, "format" may be used in a more specific reference such as "four-perforation format," in which case it simply refers to a print format having the "four-perforation" frame-height characteristic. The term "mode" is generally used to indicate the selectable operating condition of the projector movement of this invention which corresponds to the needs of the referenced format.

The film transport system, also referred to as a film projector movement or "head," includes a plurality of sprockets having teeth for engaging perforations on the film, and a motive element that rotates the sprockets and moves the film in a frame-by-frame manner past an aperture in the projector. In accordance with the invention, a control system is provided to regulate the motive element and thereby maintain or change the rotational speed and position of the sprockets in accordance with the format of the film in terms of the number of perforations spanned by each frame and in accordance with the designated frame-rate. In this way, the film transport system is capable of running film in a variety of different formats on the same projector with a minimum amount of skill required and without interrupting or delaying the operation of the projector.

In one embodiment of the invention, the film transport system includes a pair of sprockets, one on each side of a film gate, and an intermittent sprocket between the pair for advancing the film frame-by-frame past an aperture in the film gate. The rotational speed of the pair of sprockets is determined by a variable speed motor, and the rotational speed and positioning of the intermittent sprocket is determined by another motor, such as a high-response servomotor (intermittent servomotor). In this embodiment, these two motors comprise the motive element of the film transport. If desired, however, a single motor or three motors (or more) may be used as the motive element. Also, in this embodiment, a separate, third motor is employed to rotate a shutter blade which is part of the projector mechanism that must be maintained in synchronous movement. Any change in the film frame-rate will require a corresponding change in the shutter rotational speed and, therefore, the shutter motor must be either a variable speed motor or a servomotor.

The control system coordinates the output of the variable speed motor, the intermittent servomotor and the shutter motor and is responsive to a trigger signal that indicates the film's format. For example, the trigger signal may be information that is encoded on the film strip and read by a sensor. Based on the type of trigger signal that is received, the control system may change the shutter motor speed and the output of the variable speed motor which, in turn, changes the rotational speed of the pair of sprockets as well as the rate of advancement of the film frames.

The variable speed motor and the shutter motor each drive a digital optical encoder ("encoder") having a lightweight, transparent disk that has been indexed with equally spaced radial lines. A light source, such as an LED, and a photodiode straddle the encoder disk such that, in operation, the light source projects a beam of light toward the photodiode. Upon rotation of the disk, the passage of each encoder line causes the beam to be interrupted and a pulse to be emitted from the photodiode. The output of these pulses enables the control system to keep track of the exact rotational position of the motor and intermittent sprocket and to cause the motor to accelerate, decelerate or stop at an exact position with an accuracy which is a function of the number of lines on the encoder disk. Encoder disks with 1000 lines or more are commonly used in industrial motion control. Alternatively, a non-transparent disk with radial slots can be used instead of a transparent disk with radial lines. Optical encoder technology is well established and has been used for years in the motion control industry.

The initial movement of the servomotor for each frame pulldown is controlled by the output of a conventional servomotor motion control card ("controller") in conjunction with a CPU which has been programmed to provide the servomotor with a selection of predetermined move profiles, including acceleration, velocity and angular displacement in terms of encoder counts. A selection of profiles is required in order to accommodate the needs of the various frame-height formats and frame rates. This is achieved by altering the angular displacement component of the move profile and the time allotted to make the move. The actual move command originates in the shutter motor encoder when the index pole passes the photodiode. The encoder then generates a pulse which is fed through the control card to the servomotor to initiate an advance of the film by one frame. The servomotor also drives an encoder similar to that described above which is continuously monitoring servomotor position so that it can feed digitized information regarding film position to the controller, enabling it to intermittently stop film movement at the appropriate position and assure proper registration of each frame at the film gate. If desired, redundant LED/photodiode sets may be provided on each encoder.

The trigger signal is designed to indicate when the film changes format, such as when there is a change from film having frames spanning four perforations per frame to film having frames spanning three perforations per frame, or a change of specified frame-rate from 24 frames/sec. to 30 frames/sec., or both changes together. Of course, the trigger signal can be representative of a change between many different kinds of formats and, in general, is designed to indicate when the film format in the projector changes from a format having frames spanning one predetermined number of perforations to a format having frames spanning another different predetermined number of perforations, or from one predetermined frame-rate to another predetermined frame-rate, or both changes together.

The trigger signal to indicate a change in film format can be generated in a number of ways. In one embodiment, the trigger signal is generated electronically by a sensor coupled to the control system. The sensor may be designed, for example, to read encoded information carried by the film as it enters the projector to indicate a change in the film's format. This information may be encoded on a foil or magnetic strip, an optically read code, or by mechanical or other appropriate means. Alternatively, the trigger signal may be generated manually based on a visual inspection of the film by a film operator. Other suitable means of generating this trigger signal will be apparent, and the invention is not limited to manually or electronically generated signals.

Regardless of the manner of signal generation, an important feature of the invention is that the film transport system is adapted to change between film formats without interrupting or otherwise stopping operation of the projector. This eliminates any delays when switching between film formats, for example, so that different film formats may be spliced together on the same film platter system. A platter system comprises the film feed and takeup storage module for the projector. Moreover, no special skill is required to make the changeover between film formats, as the system is designed to be simple and reliable in operation, without requiring any significant training. Furthermore, the film transport system may be designed to be retrofitted to existing 35 mm projection systems, thereby avoiding the high cost of replacing an entire projection system, including the lamphouse, condenser, platter systems and other components.

Other features and advantages of the present invention will become apparent from the following description of the invention, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is an elevation view of a hold-back sprocket and an optical/digital encoder, both of which are driven by a servo motor;

FIG. 7 is an elevational view taken along line 7—7 of FIG. 6 showing an optical encoder disk;

DESCRIPTION OF THE PREFERRED EMBODIMENT

Figure 4:
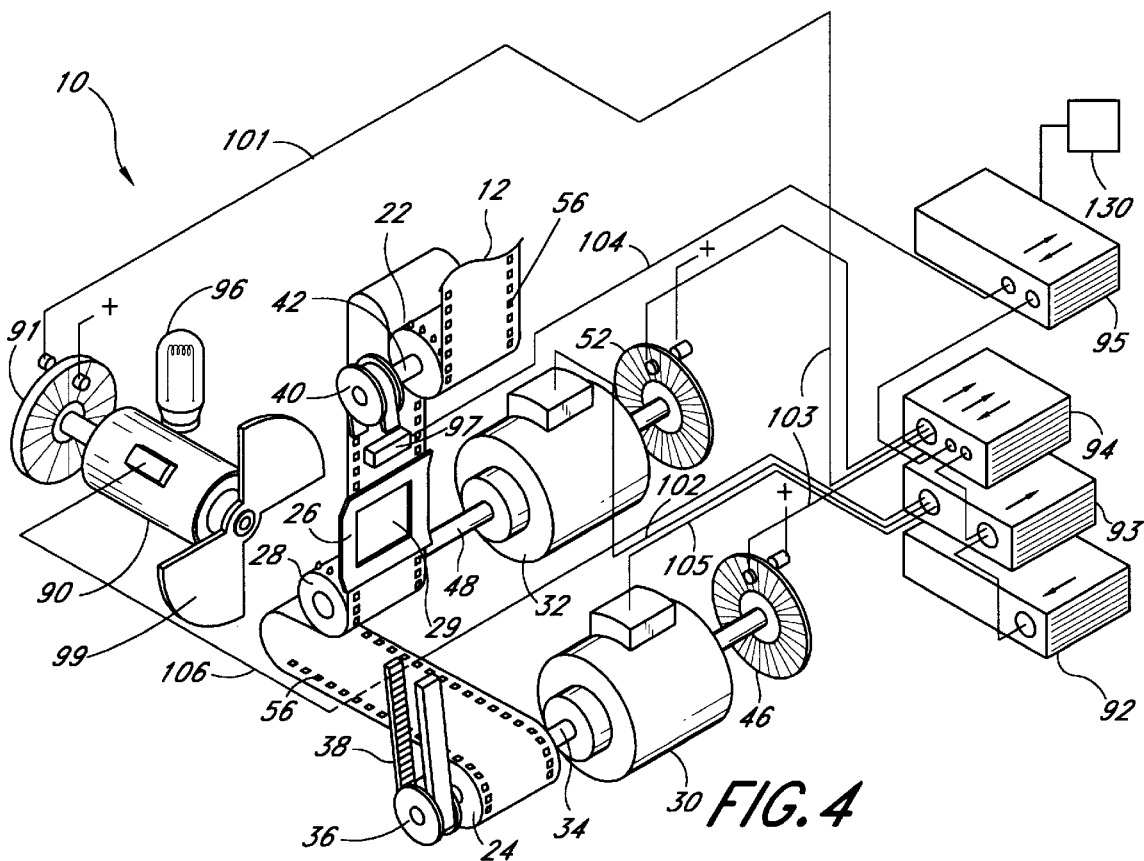
FIG. 4 is a perspective view showing the overall components of the film transport system of the present invention, including the control components, with portions of the projector removed for purposes of clarity.

The present invention is embodied in a film transport system, generally referred to by the reference numeral 10, for transporting film 12 through a projector. As shown in FIG. 4, the film transport system 10 includes two constant speed sprockets, comprising a feed sprocket 22 and a hold-back sprocket 24, located on opposite sides of a film gate 26. An intermittent sprocket 28 is located immediately below the film gate 26 and between the constant speed sprockets 22 and 24 to advance the film 12 intermittently, frame-by-frame, through the film gate in the usual manner. Thus, the intermittent sprocket 28 precisely registers each frame of the film 12 with the film gate 26 at the U.S. standard rate of twenty-four frames per second or at any other frame-rate that may be desired. The film gate 26 also includes an aperture 29. A projection light source 96 and a shutter blade 99 rotated by a shutter motor 90 are also illustrated. Slack in the film 12, in the form of loops of loose film, is provided between the feed sprocket 22 and the film gate 26 and between the intermittent sprocket 28 and the hold-back sprocket 24 to prevent film breakage.

The film transport system 10 also includes a motive element comprising a variable speed motor 30 and a servo-motor 32. The variable speed motor 30 in this embodiment may also be a servomotor. However, as explained below, the variable speed motor 30 also can be a three-speed motor, or it may provide additional speeds as desired. The intermittent servomotor 32 must be a high-response servomotor and all of the rotating components comprising the intermittent unit must exhibit a minimum polar moment of inertia in order to enable the sprocket to be accelerated and decelerated at the rate required by the intermittent duty cycle. Alternatively, it is contemplated that the motive element may comprise a single motor with mechanical or other means to drive and change the speed and position of the sprockets 22, 24 and 28.

The variable speed motor 30 rotates an output shaft 34 extending from each end of the motor. One end of the shaft 34 is connected for rotation to the hold-back sprocket 24. The shaft 34 also rotates a drive wheel 36 which carries a timing belt 38 that couples the drive wheel 36 to a second wheel 40. The second wheel 40 is connected to a shaft 42 that rotates the feed sprocket 22. Thus, the feed sprocket 22 and the hold-back sprocket 24 are coupled together by the timing belt 38 and are rotated in unison at a constant speed by the variable speed motor 30.

As also shown in FIG. 6, the shaft 34 on the variable speed motor 30 also carries a digital/optical encoder ("encoder")

46. Thus, the feed sprocket 22, the hold-back sprocket 24 and the encoder 46, which are all commonly coupled to the shaft 34 of the variable speed motor 30, are rotated at the same rotational speed. The encoder 46, as well as two other encoders described below that are associated with the servomotor 32 and shutter motor 90, each have a disk, with a light source (LED) and a photodiode straddling the disk. As explained above, rotation of the disk causes pluses to be emitted from the photodiode.

Referring again to FIG. 4, the intermittent servomotor 32 also rotates an output shaft 48 extending from each end of the servomotor. One end of the shaft 48 is connected for rotation to the intermittent sprocket 28 and the other end of the shaft 48 rotates an encoder 52.

Figures 1, 2, 3:
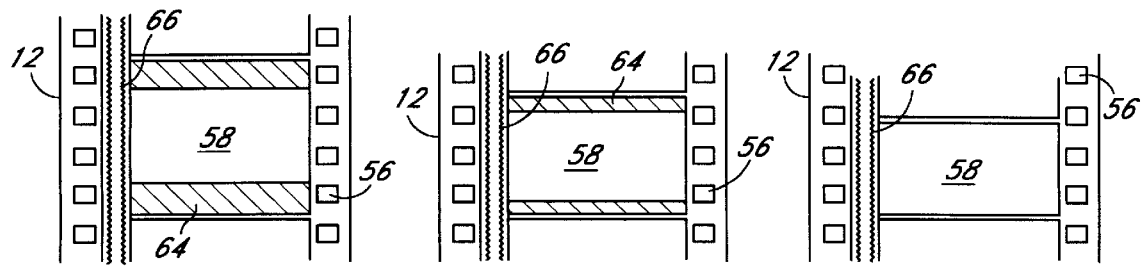
FIG. 1 shows a section of film in one format wherein each frame spans four perforations.
FIG. 2 shows a section of film in another format wherein each frame spans three perforations.
FIG. 3 shows a section of film in still another format wherein each frame spans 2.5 perforations.
Figure 5:
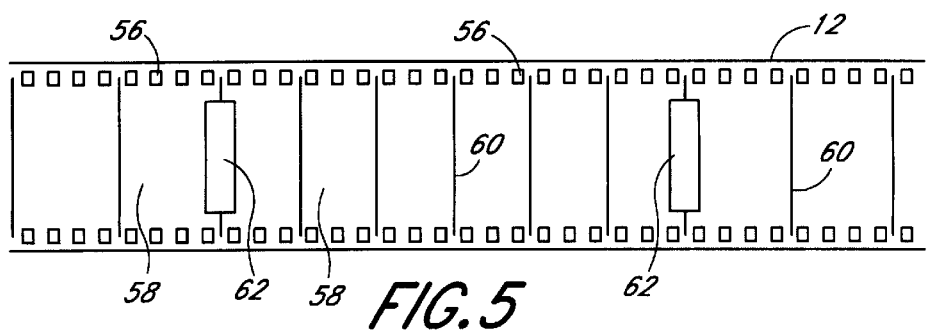
FIG. 5 shows a strip of film having multiple formats suitable for use in the film transport system.

FIG. 5 shows a section of film 12 having a plurality of perforations 56 along the edges of the film. Between the perforations 56 are frames 58 which, for purposes of illustration, are separated by vertical lines 60. The section of film 12 which is standard 35 mm film, is shown as having different formats across its length. The left and right sections of the film 12 have a format in which each frame 58 spans four perforations 56. The center section of the film 12 has a format in which each frame 58 spans three perforations 56. The transition between these two formats is represented by a trigger strip 62, the function of which will be explained in more detail below. FIGS. 1 and 2, previously discussed, show the two film formats in greater detail.

FIG. 4 also shows a host computer ("CPU") 95, a motor controller 94, a motor amplifier 93 and a d.c. power supply 92 which, together, comprise the power/control system ("control system"). The motor controller 94 includes controllers for the variable speed motor 30, the servomotor 32 and the shutter motor 90. Similarly, the motor amplifier 93 includes amplifiers for each of these motors 30, 32 and 90. Located near the entrance of the film gate, is a sensor 97 which is used to detect the format change information, encoded on the film trigger strip 62, which is then relayed to the control system.

The operation of the film transport system 10 is described below and is best understood with reference to FIG. 4 in conjunction with FIGS. 7 & 8. For purposes of this description, it will be assumed that the film transport system 10 is initially set for operation with a film format in which each frame spans four perforations and the frame rate is the standard 24 frames/sec., followed by subsequent switching to a film format in which each frame spans three perforations and the projection frame-rate is 30 frames/sec., such as when these two film formats are spliced together on the same projector platter system. For convenience, these two film formats are referred to below as the "24-four format" and the "30-three format," respectively.

In this case there shall be two control cards employed. One card is a "shutter controller" serving the shutter motor as well as the variable speed motor, and the other card is a "intermittent controller" or "servomotor controller" serving the intermittent servomotor. Any reference to the "control system" also shall include both controllers and any related software.

At the outset, the control system has been conditioned for the 24-four format of operation by information derived from contact by the sensor 97 with an opening trigger strip 62 or from the existence of a default mode in the loop. The shutter motor 90 as well as the variable speed motor 30 are therefore energized and commanded by the control system to rotate their output shafts at the appropriate respective rotational speeds corresponding to 35 mm film having the 24-four format. This results in rotation of the feed sprocket 22 and the hold-back sprocket 24, in the film advance direction, thereby supplying and taking up equal amounts of film 12 on opposite sides of the film gate 26 and the intermittent sprocket 28. At the same time, the variable speed motor 30 rotates the encoder 46, and the shutter motor 90 rotates the shutter 99 at 24 revolutions/sec., while at the same time rotating a encoder 91 at the same rate.

The shutter encoder 91 has been rotationally adjusted such that the passage of the encoder-disk index-pole between its associated LED and photodiode corresponds with the projector shutter 99 first reaching the fully-closed position. With the shutter 99 closed, no light is able to reach the screen and any movement of the film in the gate 26 due to frame advancement will not be perceived by the viewers. Passage of the index pole causes an index pulse 101 to be generated by the shutter motor encoder 91 and this pulse is directed to the motor controller 94. The motor controller 94 then sends a signal 102 to the servomotor 32 to advance the film 12 by the rotational equivalent of one frame, in accordance with the pre-programmed four-perforation move profile. Thus, with the shutter motor 90 turning at 24 revolutions/sec, the intermittent movement follows with a 24 frame/sec, four-perforation film advance until signaled to do otherwise. As the film advances, the CPU 95 is continuously looking for a signal from the sensor 97 indicating a change in format. When this change occurs, it signals the motor controller 94 to change the mode of operation by changing the various motor outputs as required by the incoming film format.

Figure 8:
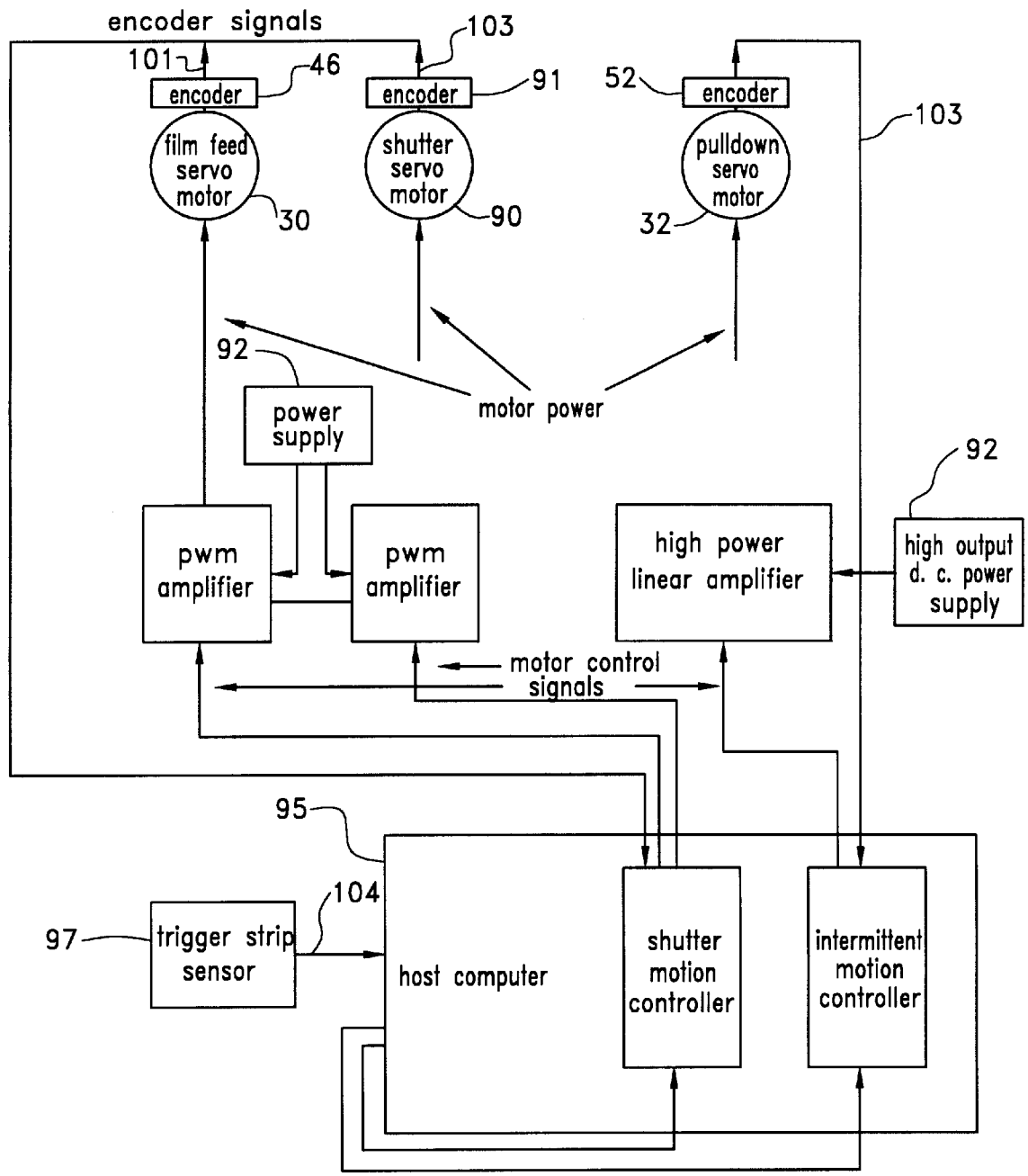
FIG. 8 is schematic layout of the principal components of the film transport system.
Figure 9:
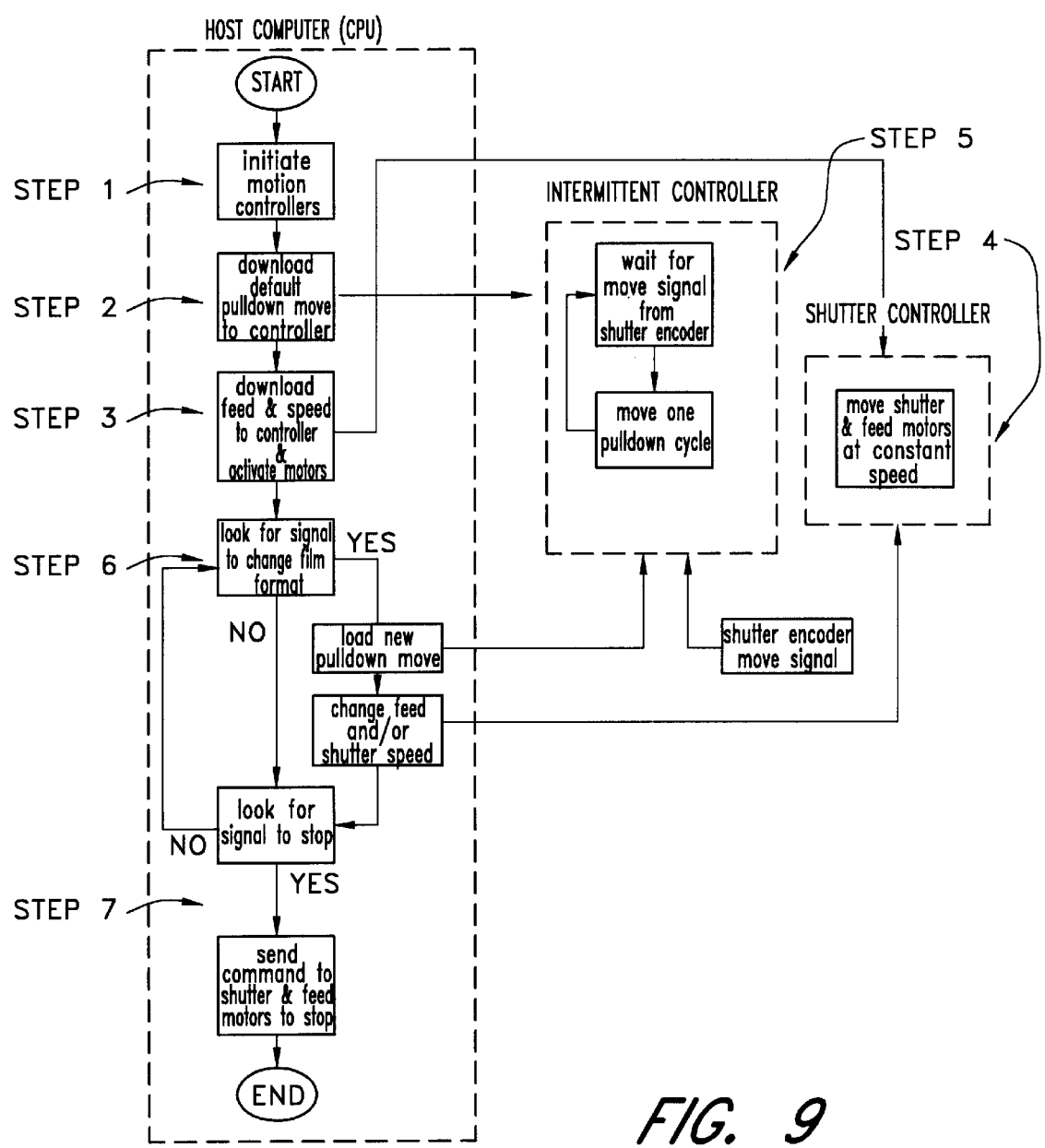
FIG. 9 is a flow diagram showing the communication paths between the principal components of the film transport system.

Referring to FIGS. 7 and 8, the sequence of events can be generally summarized as follows:

1. The control system is switched on and the motor controllers 94 are initiated.

2. The default move profile is loaded into the intermittent servomotor controller from the CPU 95.

3. The default film feed and frame rates are loaded into the shutter motor controller from the CPU 95.

4. The variable speed motor 30 and shutter motor 90 are each accelerated to a constant speed.

5. The intermittent servomotor controller continuously reacts to the once-per-revolution index pulse generated by the shutter motor encoder 91 causing the sprocket 28 to rotate intermittently per the loaded move profile and causing the film 12 to advance by one-frame for each index pulse received and then stop for projection.

6. The CPU 95 enters a loop wherein it continuously looks for a trigger signal indicating a change in film format and, hence, operating mode. When this change occurs, signals are sent to the motor controllers 94 to change the frame-height and frame-rate accordingly.

7. Step 5 continues uninterrupted until the CPU 95 encounters another format change signal causing Step 6 to be repeated or a "stop" signal from the sensor 97, at which time it instructs the motor controllers 94 to shut down the system 10.

In this manner the intermittent movement is slaved to the shutter motor 90 in terms of frame-rate and slaved to the intermittent servomotor controller 94 in terms of the increment of film advance.

As the intermittent sprocket 28 is driven, the film 12 is advanced through the film gate 26 at the rate of one frame for each output pulse 101 of the shutter encoder 91. During this operation, the motor controller 94 ensures that each film frame is positioned precisely in the film gate 26. This is accomplished in the following manner.

As the intermittent sprocket 28 advances the film frame 58 into position in the film gate 26, the intermittent encoder 52 is sensing the position of the servomotor/intermittent sprocket (32, 28) and, likewise, the position of the film frame 58, in terms of number of encoder lines advanced and is feeding this information to the servomotor controller 94 via feedback signals 103. The servomotor controller 94 is then comparing this actual position with the ideal position defined by the commanded move profile and, correspondingly, generating correctional signals 102 instructing the servomotor 32 to accelerate, decelerate or stop. In this manner, the film frame 58 is rapidly moved into the film gate 26 and positioned with the greatest accuracy.

With respect to the sequence of events described above, the previously mentioned power/control system (control system) functions in the following manner. Since the high-response intermittent servomotor 32 requires a very large supply of power in a very short time, it is necessary to provide the control system with a high-output d.c. power supply 92. The management of this power supply 92 is provided by the motor amplifiers 93 which are, in turn, managed by the motor controllers 94. Therefore, when it is said herein that the controller 94 sends signals to the motors to accelerate, decelerate or stop, this is really shorthand for saying that the controller 94 sends signals to the motor amplifiers 93 that are employed to meter out power from the power supply 92 to the motors in the manner necessary to achieve the commanded move or the adjustment.

As the film 12 continues to advance through the system 10, one of the trigger strips 62 on the film will be read by the sensor 97 ahead of the film gate 26. In one embodiment, the trigger strip 62 carries information that is magnetically, optically or otherwise encoded or applied onto the strip 62. Ideally, the trigger strip 62 is located at the splice between the two film formats, as shown in FIG. 5. The information read by the sensor 97, in this case by way of example, indicates a change of film format from the 24-four format to the 30-three format and an appropriate pulse or series of pulses 104 is generated by the sensor 97 corresponding to this change in format This pulse-stream 104 is amplified in an amplifier (not shown) and directed to the CPU 95 which serves as the watchdog for format changes and loads the motor controller 94 with the appropriate move profile to change motor output as necessary to satisfy the requirements of the new mode of operation.

At the same time that the format changeover is taking place, the change in frame-rate must also be accomplished. The same encoded trigger signal 104 that was derived from the trigger strip 62 on the film 12 is used to accomplish both tasks. The trigger signal 104 is directed to the section of the motor controller 94 which serves the shutter motor 90 and that component of the encoded signal that identifies the projector frame-rate causes the shutter motor 90 to adjust speed accordingly, which in this case is an increase to 30 revolutions/sec. Since the film advance must always be maintained in synchronization with the shutter rotation, as previously described, the intermittent servomotor 32 is slaved to the movement of the shutter 99. For each revolution of the shutter motor 90, an index pulse is generated by the encoder 91 which is directed to the intermittent servomotor section of the controller 94. The controller 94, in turn, sends a signal to the servomotor 32, via the motor amplifier 93, to advance the film 12 by one frame 58, which in this case is three perforations. In this manner, the projection frame-rate is increased from 24 frames/sec. to 30 frames/sec. at the same time that the frame-height is changed from four-perforation to three-perforation with no halt in the operation.

It is important to note that in the three-perforation format, shown in FIG. 2, the frame's center line, from left to right, passes through the center of a film perforation 56. In the four-perforation format, shown in FIG. 1, however, the frame's center line bisects the space between two film perforations 56—an offset of one-half of a perforation between the two formats. Consequently, the first center-to-center step when changing from a four-perforation format to a three-perforation format must be a step of 3.5 perforations. Without this initial indexing move the projected image would be incorrectly framed, in that the line separating the film frames would appear on the screen. Thereafter, the center-to-center spacing will be a constant three perforations per frame. The film transport system 10 is designed to accommodate this offset by an initial repositioning of the intermittent sprocket 28 with respect to tooth orientation in the halted position. This can be accomplished by programming the controller 94 to initiate a first step equal to one-half the sum of the outgoing and the incoming frame sizes (in this case (4+3)/2=3.5 perforations). This indexing step must be executed precisely at the film splice in order to avoid a framing error and the need for subsequent correction. In this manner, the intermittent sprocket 28 is reoriented to maintain proper picture framing in the three-perforation format and all subsequent moves are three-perforation advances.

It will be appreciated that the film transport system 10 is capable of switching, not only between the two film formats described above, but between any other number of film formats. Thus, by way of further example, the film transport system 10 may be configured to use the film format shown in FIG. 3, which illustrates a section of film 12 in which each frame 58 spans 2.5 perforations. When the film transport system 10 is switching from the four-perforation format to the 2.5-perforation format, an initial step of 3.25 perforations ( (4+2.5)/2=3.25), followed by subsequent steps of 2.5 perforations will be required and will be accomplished in the same manner described above. Similarly, the changeover from the three-perforation format to the 2.5-perforation format will require a first step of 2.75 perforations.

Since the sensor 97 is preferably positioned ahead of the film gate 26, the passage of the trigger strip 62 over the sensor 97 will generate a pulse 104 slightly before the film 12 is in the proper position for a changeover. Consequently, the control system must provide for a delay in the process. The period of the delay will be determined by the distance between the sensor 97 and the film gate 26, a constant, and the current mode of operation of the system 10, as determined from the encoded information on the trigger strip 62. Because the film 12 is moving slower in the three-perforation format, the delay period will be slightly longer. An alternative means for compensating for the offset position of the sensor 97 would be to offset the trigger strip placement on the film print (i.e., lagging) by an amount equal to the sensor offset from the film aperture 29. In this manner the changeover will be accurately timed under any condition of frame-height or frame-rate without need for inclusion of a time delay.

At such time as another trigger strip 62 on the film 12 is read by the sensor 97 another pulse 104 will be sent to the controller 94 via the CPU 95, which will signal all components of the system 10 to return to the operational condition corresponding to the 24-four format, as described above, or to any other mode of operation that may be specified on the encoded trigger strip.

It is also contemplated that the trigger strip 62 may be a foil strip which cannot be demagnetized, an optically read code, a mechanical trigger (e.g., notching, punching or embossing the film) or other appropriate means. Also, if desired, the sensor 97 can be replaced or augmented by a manual switch 130 on the projector 14 to initiate a format changeover based on a visual inspection of the film 12 by a film operator.

Of course, it will be understood that when a new reel or platter of film 12 having a constant format is first loaded into the projector, the trigger strip 62 may be placed at the beginning of the film strip or a manual switch 130 must be activated to command the appropriate operation of the projector. Thus, upon reading the trigger strip 62 or upon activation of a manual switch 130, the control system can make the necessary adjustments, described above, to operate the film transport system 10 in the appropriate manner for the particular format of the film 12 being run through the projector.

In addition, it will be appreciated that redundant encoders may be provided for each of the motors. This redundancy helps ensure trouble free operation in the event of a malfunction of one of the associated sets of LED's or photocells/photodiodes.

The switchable format projection system described above will allow distributors to manufacture release prints in alternate formats which eliminate waste. In doing so they will save materials and money with no concurrent reduction in the quality of the image shown to consumers. The benefits of this process go well beyond those initial savings. Because the waste is eliminated, the prints are physically shorter and lighter. Therefore they cost less to ship and may even be shipped fully platter-mounted and ready for projection.

Presently, a 100 minute film is 9,000 feet long and, owing to the weight, is shipped in 2000 foot reels. These reels must be joined together on the specific projector for the screen they are to be shown on. This process is called "mounting" the show. It must be done by a skilled individual such as a projectionist. When the theater management decides to move that print to another screen, it must usually be "broken down" and "remounted" again, as it is too heavy to easily move from projector to projector on a platter. However, in the new more-compact form made possible by the present invention, that same 100 minutes will be only 6,750 feet long (using film having a three-perforation format) or 5,625 feet (using film having a 2.5-perforation format). At this reduced length and weight, it will be possible to ship films in a single pre-mounted reel and move that reel from projector to projector without "breaking-down" and "re-mounting" the show.

A further advantage of the film transport system 10 of the present invention resides in its ability to automatically rewind an entire platter system, which supplies and takes-up film to and from the film transport system 10. In prior platter systems, the projectionist is required to re-thread the system between showings of each complete mounted platter. Moreover, conventional film transport systems employ mechanical devices that prevent the execution of high-speed film rewind. The film transport system 10 of the present invention, however, eliminates these mechanical devices and utilizes a fully electronic design that avoids intermittent movement at the intermittent sprocket 28 during the rewind operation and, therefore, provides a smooth, high speed film movement in reverse. The film transport system 10 can be commanded to operate in the high-speed rewind mode by providing a trigger strip 62 at the end of the film 12 which, by the process described above, commands the motors 30 and 32 to rewind the film at high speed.

From the foregoing it can be seen that different or additional film formats may be run on the film transport system 10 by appropriate programming of the control system to identify the format or frame-rate from its trigger strip code and to provide the various motors with the appropriate commands to operate harmoniously in the newly defined mode of operation. In this way, the film transport system 10 of the present invention, among other things, can: (1) switch back and forth between film formats having different frame-heights: (2) switch between formats having different film frame-rates, and (3) perform any format changes on the same platter of film 12, automatically, without interrupting or halting operation of the projector 14. Never before has any single design been proposed featuring or even suggesting more than one of these three features.

This combination of features should be roundly applauded by producers and directors of films with budgets ranging from less than $1 million up to $100 million and beyond. Finally there will be an ideal format available to everyone. Low budget productions can enjoy the financial benefits of reduced release print costs and high budget films can enjoy the enhanced presentation value of the larger and higher speed formats.

This flexibility will also be welcomed by film distributors and exhibitors, who will then have greater options in bringing two (or more) different film formats together on the same platter of film. The expense and effort in film distribution and exhibition is thus greatly reduced. Moreover, for projection purposes, little skill or training is required to implement the changeover between film formats, thus making the system ideal for operation by relatively unskilled movie theater employees.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A film projector movement for transporting film through a motion picture projector, wherein the film has a series of frames and a plurality of perforations along edges of the film, comprising:

a plurality of sprockets having teeth for engaging the perforations and for moving the film through the projector;

an intermittent advance mechanism that moves the film frame-by-frame past an aperture in the projector;

a motive element that rotates the sprockets and actuates the intermittent advance mechanism; and a controller that controls the motive element and is adapted to either maintain or change the rotational speed of the sprockets and the positioning of the intermittent advance mechanism based on the format of the film in terms of the number of perforations spanned by each frame on the film, wherein the frames of the film are recentered with respect to the aperture each time there is a change in the film format, and wherein the controller is further adapted to maintain or change the projection frame-rate in terms of frames per second.

2. The film projector movement of claim 1, wherein the plurality of sprockets comprises a pair of constant speed sprockets, one on each side of the aperture, having teeth for engaging the perforations and for moving the film through the projector.

3. The film projector movement of claim 2, wherein the intermittent advance mechanism comprises an intermittent sprocket having teeth for engaging the perforations and for advancing the film intermittently frame-by-frame past the aperture.

4. The film projector movement of claim 3, wherein the motive element comprises:
- a first motor having a rotational output for rotating the pair of constant speed sprockets;
- a second motor having a rotational output for intermittently rotating the intermittent sprocket; and
- a third motor having a rotational output for rotating a shutter.

5. The film projector movement of claim 4, wherein the first motor comprises a servomotor, and the second motor comprises a servomotor.

6. The film projector movement of claim 5, wherein the controller controls and coordinates the first and second motors and is responsive to a trigger signal for changing the output of the first and second motors, individually, and thus the rotational speed of the pair of sprockets and the positioning of intermittent sprocket, wherein the trigger signal indicates when the film in the projector changes from a format in which each frame spans a first predetermined number of perforations on the film to a format in which each frame spans a second predetermined number of perforations on the film.

7. The film projector movement of claim 5, wherein the controller controls and coordinates the third motor and is responsive to a trigger signal for changing the output of the third motor and thus the rotational speed of the shutter, wherein the trigger signal indicates when the film in the projector changes from a mode in which the film advances at a first predetermined frame-rate to a mode in which the film advances at a second predetermined frame-rate.

8. The film projector movement of claim 7, wherein the controller, in response to the trigger signal, controls the output of the second motor to execute a first "indexing" film advance, the span of which is determined by the frame-heights of the outgoing and incoming film formats, followed by an output of successive film advances with a span corresponding to the frame-height of the incoming format.

9. The film projector movement of claim 8, wherein the trigger signal is based on the number of perforations spanned by each frame on the film.

10. The film projector movement of claim 9, wherein the trigger signal is generated automatically during operation of the projector by electronic, magnetic, optical, or mechanical means.

11. The film projector movement of claim 9, wherein the trigger signal is generated manually.

12. The film projector movement of claim 2, wherein the intermittent advance mechanism comprises a mechanism other than a rotating toothed-sprocket.

13. The film projector movement of claim 12, wherein the intermittent advance mechanism may either rotate or provide reciprocal motion to intermittently advance the film.

14. The film projector movement of claim 13, wherein the motive element comprises:
- a first motor having a rotational output for rotating the pair of constant speed sprockets;
- a second motor having a rotational or reciprocal output for actuating the intermittent advance mechanism; and
- a third motor having a rotational output for rotating a shutter.

15. The film projector movement of claim 13, wherein the motive element comprises:
- a first motor having a rotational output for rotating the pair of constant speed sprockets; and
- a second motor having a rotational or reciprocal output for actuating the intermittent advance mechanism and the shutter.

16. In a motion picture film projector, a film projector movement for transporting film having a series of frames with images thereon, and a plurality of perforations along edges of the film, comprising:
- an intermittent advance mechanism for engaging the perforations and for advancing the film frame-by-frame past an aperture in the projector;
- a pair of constant speed sprockets, one on each side of the aperture and the intermittent advance mechanism, having teeth for engaging the perforations and for moving the film through the projector in cooperation with the intermittent advance mechanism;
- a first motor having a rotational output for rotating the pair of constant speed sprockets;
- a second motor having a rotational or reciprocating output for actuating the intermittent advance mechanism;
- a third motor having a rotational output for rotating a shutter;
- a first controller that controls and coordinates the rotational output of the first motor, wherein the first controller is adapted to change or maintain the rotational output of the first motor, without substantially interrupting projector operation, to thereby change or maintain the rotational speed of the pair of constant speed sprockets when the film in the projector changes from a first film format in which each frame spans a first predetermined number of perforations on the film to a second film format in which each frame spans a second predetermined number of perforations on the film;
- wherein the first controller also controls and coordinates the third motor and is responsive to a trigger signal for changing the output of the third motor and thus the rotational speed of the third motor, wherein the trigger signal indicates when the film in the projector changes from a mode in which the film advances at a first predetermined frame-rate to a mode in which the film advances at a second predetermined frame-rate; and
- a second controller which, in response to the trigger signal, controls the output of the second motor to execute a first indexing film advance, the span of which is determined by the frame-heights of the outgoing and incoming film formats, followed by an output of successive film advances with a span corresponding to the frame-height of the incoming format.

17. A film projector movement for transporting film through a projector, wherein the film has perforations along its edges and frames between the perforations, comprising:
- a plurality of sprockets and an intermittent movement device for moving the film through the projector;
- motor means for rotating the sprockets and actuating the intermittent movement device at selected speeds and for intermittently positioning the film frame-by-frame past an aperture in the projector;
- control means for controlling the motor means and for either maintaining or changing the movement of the intermittent movement device, the rotational speed of the sprockets and the movement of the film based on the format of the film in terms of the number of perforations spanned by each frame on the film and based on the projection frame-rate in terms of frames per second; and
- control means for controlling the motor means and for providing a first indexing move, based on the frame-heights of the outgoing and incoming film formats, to provide proper framing of the incoming film format.

18. A method of transporting film through a projector having a motive element that rotates a plurality of sprockets that advance the film, and an intermittent movement device that moves the film frame-by-frame past an aperture, comprised of determining the film format in terms of the number of perforations spanned by each frame on the film and determining the film frame-rate in terms of frames per second passing through the aperture, and controlling the motive element to either maintain or change the rotational speed of the sprockets and the movement of the intermittent movement device based on the film format and the film frame rate, and wherein the frames of the film are recentered with respect to the aperture each time there is a change in the film format.

19. A method of transporting film through a projector having a pair of constant speed sprockets that engage perforations on the film to advance the film at a uniform rate and an intermittent advance device to advance the film frame-by-frame past an aperture in the projector, wherein a first motor has a rotational output that rotates the constant speed sprockets, a second motive element has an output that positions the intermittent advance device, and a third motor has a rotational output that rotates a shutter, comprised of:

determining the incoming film frame-height in terms of the number of perforations spanned by each frame on the film;

determining a first indexing move based on the frame heights of the outgoing and incoming film formats;

determining the film frame-rate in terms of frames per second passing through the aperture;

controlling the rotational output of the first motor and the rotational speed of the constant speed sprockets based on the film format;

controlling the output of the second motive element and the positioning of the intermittent advance device based on said first indexing move and the incoming film format; and controlling the output of the third motor and also the movement of the intermittent advance device based on the film frame-rate.

20. The method of claim 19, further comprised of generating a trigger signal that controls the output of the first, second and third motors, wherein the trigger signal is based on the film format and frame-rate.

21. The method of claim 20, further comprised of encoding information onto the film that identifies the film format and frame-rate, and then sensing that information to generate the trigger signal.

22. The method of claim 21, further comprised of sending the trigger signal to a controller that, based on the trigger signal, generates a second signal that controls the rotational output of the first motor.

23. The method of claim 22, further comprised of providing a plurality of trigger strips on the film at locations corresponding to a change in the film format or frame-rate, encoding information onto the trigger strips that identifies the changed film format or frame-rate, and sensing that information to generate the trigger signal.

* * * * *